United States Patent
Castro-Leon et al.

(10) Patent No.: US 9,454,199 B2
(45) Date of Patent: Sep. 27, 2016

(54) POWER MANAGEMENT CONTROL OF REMOTE SERVERS

(75) Inventors: Enrique G. Castro-Leon, Clackamas, OR (US); John Kennedy, Clane (IE)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 13/536,916

(22) Filed: Jun. 28, 2012

(65) Prior Publication Data

US 2014/0006815 A1    Jan. 2, 2014

(51) Int. Cl.
| | |
|---|---|
| G06F 1/00 | (2006.01) |
| G06F 1/26 | (2006.01) |
| G06F 1/32 | (2006.01) |
| G06F 9/50 | (2006.01) |

(52) U.S. Cl.
CPC ............. *G06F 1/266* (2013.01); *G06F 9/5094* (2013.01); *G06F 1/32* (2013.01); *Y02B 60/142* (2013.01)

(58) Field of Classification Search
CPC ..................................... G06F 1/26; G06F 1/32
USPC .................. 713/310, 300, 324, 340
See application file for complete search history.

(56) References Cited

U.S. PATENT DOCUMENTS

| | | | | |
|---|---|---|---|---|
| 8,032,776 | B2 * | 10/2011 | Merkin | 713/324 |
| 2004/0088541 | A1 | 5/2004 | Messerges et al. | |
| 2004/0103312 | A1 * | 5/2004 | Messerges et al. | 713/201 |
| 2005/0198245 | A1 * | 9/2005 | Burgess et al. | 709/223 |
| 2006/0265353 | A1 * | 11/2006 | Garg et al. | 707/2 |
| 2007/0050644 | A1 * | 3/2007 | Merkin | 713/300 |
| 2007/0130481 | A1 * | 6/2007 | Takahashi | G06F 21/41 713/300 |
| 2007/0271475 | A1 * | 11/2007 | Hatasaki | G06F 1/3203 713/324 |
| 2008/0162956 | A1 * | 7/2008 | Bozek et al. | 713/310 |
| 2008/0178018 | A1 * | 7/2008 | McGrane et al. | 713/320 |
| 2009/0031153 | A1 * | 1/2009 | Bahali et al. | 713/310 |
| 2009/0077394 | A1 | 3/2009 | Tsai et al. | |
| 2009/0138734 | A1 * | 5/2009 | Uchida | 713/310 |
| 2009/0184161 | A1 | 7/2009 | Ueno et al. | |

(Continued)

FOREIGN PATENT DOCUMENTS

KR    10-2012-003868 A    4/2012

OTHER PUBLICATIONS

International Search Report and Written Opinion mailed Dec. 17, 2013 for International Application No. PCT/US2013/043915, 18 pages.

(Continued)

*Primary Examiner* — Phil Nguyen
(74) *Attorney, Agent, or Firm* — Schwabe, Williamson & Wyatt, P.C.

(57) ABSTRACT

Servers, storage medium and methods associated with control of power management services of remote servers of a remote computing service are disclosed herein. In embodiments, a storage medium may have instructions to enable a local server to query a remote computing service having one or more remote servers. The instructions may enable the local server to receive a record from the remote computing service in response to the query. The record may include information related to power management services available from the one or more remote servers. The instructions may enable the local server to transmit power management commands, based on the information, to the remote computing service to at least partially control power consumption by the one or more remote servers. Other embodiments may be disclosed or claimed.

25 Claims, 3 Drawing Sheets

(56) References Cited

U.S. PATENT DOCUMENTS

| | | | |
|---|---|---|---|
| 2009/0187775 A1* | 7/2009 | Ishikawa | 713/310 |
| 2009/0195349 A1 | 8/2009 | Frader-Thompson et al. | |
| 2009/0222679 A1* | 9/2009 | Lee | 713/300 |
| 2009/0254660 A1* | 10/2009 | Hanson et al. | 709/226 |
| 2010/0162013 A1* | 6/2010 | Oh et al. | 713/310 |
| 2011/0072293 A1* | 3/2011 | Mazzaferri | G06F 1/3203 713/340 |
| 2012/0080949 A1 | 4/2012 | Gelonese | |
| 2012/0117399 A1* | 5/2012 | Chan et al. | 713/320 |

OTHER PUBLICATIONS

International Preliminary Report on Patentability for PCT Application No. PCT/US2013/043915, dated Jan. 8, 2015, 13 pages.

* cited by examiner

POWER MANAGEMENT CONTROL OF REMOTE SERVERS

TECHNICAL FIELD

This application relates to the technical field of data processing, more specifically to methods and apparatuses associated with remote control of power management of remote computing servers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Large information technology (IT) applications may encompass hundreds of servers in data centers with an annual electricity bill in the order of hundreds of thousands of dollars. Because it is difficult to know server power consumption in advance, servers at data centers are usually deployed with an over-commitment of power, and customers of the data centers often pay the power bill of the over-commitment. The Uptime Institute calculates that the starting data center capital cost for each installed kilowatt is about $10 thousand dollars, and without special measures, that's just enough to power two servers.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
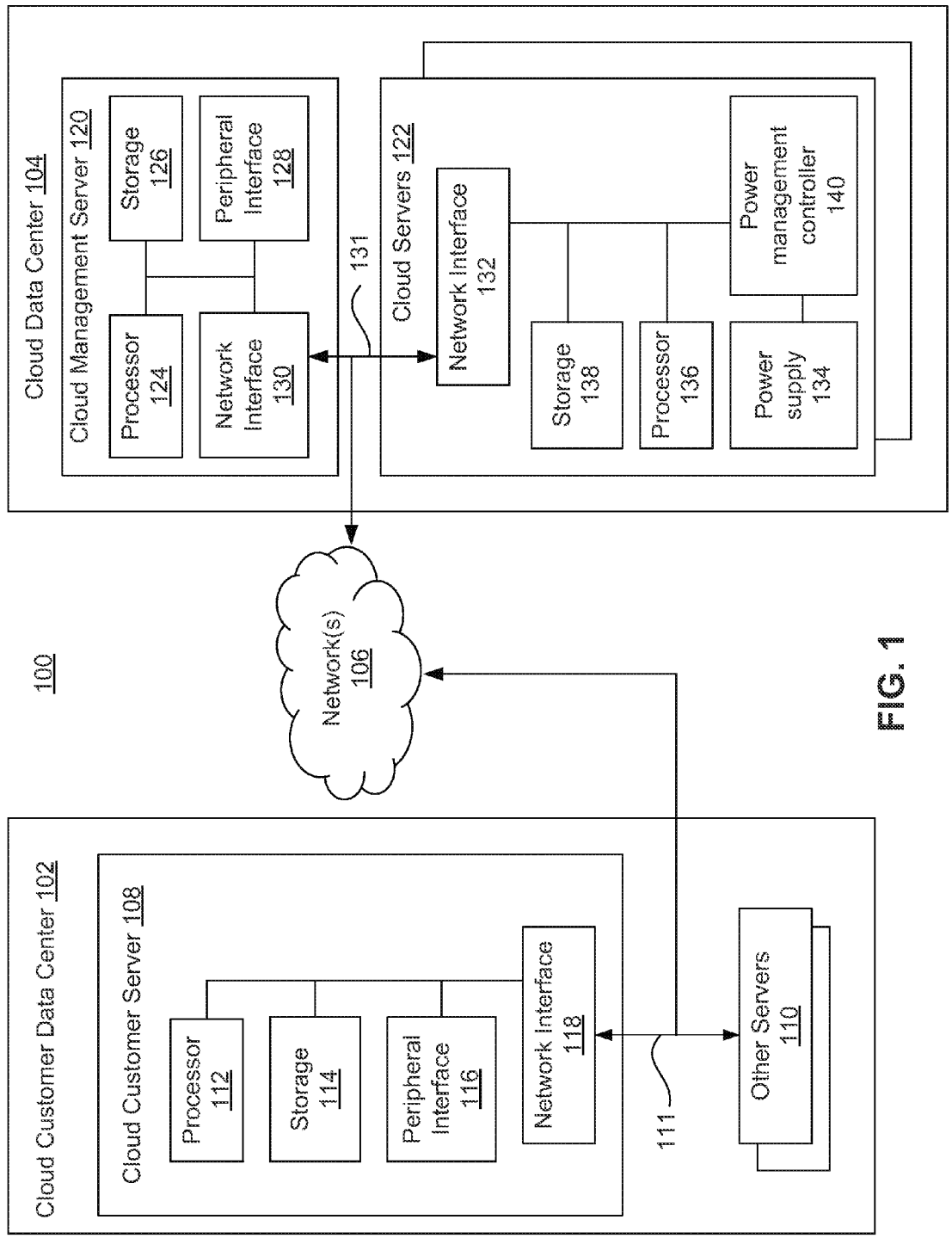
FIG. 1 illustrates an arrangement configured to enable a remote server, that is a customer of a remote computing service, to power manage remote servers that may provide the remote computing service.

FIG. 1 illustrates an arrangement 100 configured to enable a customer of a remote computing service to extend power management policies of the customer directly to servers that may be providing the remote computing service, i.e., across remote computing service boundaries, in accordance with various embodiments. Remote computing, with accompanying support servers, often referred to by those skilled in the art as cloud computing, cloud servers, and/or variants of the like. Thus, for readability, concept of remote computing and other variants, may be referred to as cloud computing, cloud servers, and/or the like in the description to follow. These terms are meant to be synonymous, unless the context clearly indicates otherwise. As shown, arrangement 100 may include a cloud customer data center 102 and a cloud data center 104 coupled with each other via network(s) 106. Cloud customer data center 102 may be a recipient of cloud services, such as a company who subscribes to cloud services from a cloud services provider. Cloud customer data center 102 may include a cloud customer server 108 that may be a local server configured to manage various requests for data and/or other services from clients or network users. Cloud customer server 108 may be a server configured to manage other servers 110. Cloud customer server 108, in combination with other servers 110, may collect, store, and provide data and/or data services, upon request, to users of network(s) 106. Cloud customer server 108 may be configured to define, determine, and implement one or more power management policies on other servers 110. For example cloud customer server 108 may be configured to monitor the working capacity of each of other servers 110 and, in response to receiving feedback regarding the capacity of other servers 110, cloud customer server 108 may provide commands to other servers 110 to cause other servers 110 to enter a low-power mode, to power down, to hibernate, or the like. According to embodiments, cloud customer server 108 and other servers 110 may share a subnetwork (subnet) and may be connected via a network connection 111.

Cloud customer server 108 may include a processor 112, storage 114, peripheral interface 116, and a network interface 118.

Processor 112 may be configured to execute one or more instructions stored on storage 114. For example, processor 114 may be configured to execute instructions that enable cloud customer server 108 to determine and/or change a power management policy of other servers 110. Processor 112 may be any one of a number of single or multi-core processors known in the art, e.g., those available from Intel® Corporation of Santa Clara, Calif.

Storage 114 may be volatile memory, non-volatile memory, or include both volatile and non-volatile memory. For example, storage 114 may include random access memory (RAM), flash memory, optical disk memory, magnetic field based memory, hard disk drives, or the like. As discussed above, storage 114 may be configured to store a plurality of instructions which, in response to execution by processor 112, may enable cloud customer server 108 to detect, determine, request, and/or adjust one or more power management policies.

Peripheral interface 116 may include, but is not limited to, universal serial bus (USB) ports, PS/2 ports, interfaces to interact with display devices, wireless devices, and or other types of potential user and/or electronics interfaces.

Network interface 118 may be configured to selectively connect cloud customer server 108 to other servers 110 and to network(s) 106. Network interface 118 may include, but is not limited to, a wireless local area network interface. An example of a wireless local area network interface may be a WiFi® interface in compliance with one of the IEEE 802.11 standards. (IEEE=Institute of Electrical and Electronic Engineers.) In alternate embodiments, network interface 118 may include a wireless personal network interface. An example of a wireless personal network interface may be a Bluetooth® interface. In still other embodiments, network interface 118 may include a wireless wide area network. An example of a wireless wide area network interface may be a 3G or 4G telecommunication interface. (3G and 4G refer to the $3^{rd}$ and $4^{th}$ Generation of Mobile Telecommunication Standards as defined by International Telecommunication Union.)

Cloud data center 104 may be a data center arranged to store and/or operate a plurality of servers configured to provide cloud services to customers, such as to cloud customer data center 102. Cloud data center 104 may include cloud management server 120, cloud servers 122, and a variety of facility services to provide power, heating, and cooling services to the cloud management server 120 and cloud servers 122. In a typical cloud data center 104 arrangement, a customer of the services provided by cloud data center 104 may be charged for services based in part on the amount of power consumed by each cloud server 122, based on the amount of power used to climate control cloud data center 104, as well as based on the number of cloud servers 122 for which technical support is provided through the cloud data center 104. Cloud data centers may, for various security reasons, block customers and/or other users from accessing certain types of information from cloud servers 122 and may block computer systems that are remote to cloud data center 104 from manipulating cloud servers 122. As a result, cloud data center 104 may operate cloud servers 122 so that cloud servers 122 provide as much bandwidth as cloud servers 122 may provide, without concerns for energy efficient usage or operation of cloud servers 122. Thus, clients of services provided by cloud data center 104 may be paying for energy costs that may be may be decreased by selective modification to the power policies of cloud servers 122.

Cloud management server 120 may be configured to query cloud servers 122 to determine whether each of cloud servers 122 provide or may provide power management services. With reference to cloud customer server 108, cloud management server 120 may be a remote server configured to provide support for or to provide one or more remote computing services, e.g., cloud services. Cloud management server 120 may be configured to query each of cloud servers 122 and compile a list or a record based on the responses from cloud servers 122. The record created by cloud management server 120 may include a variety of data. For example, the record may include a list of ones of the cloud servers 122 enabled to provide power management services or capabilities. The record may also include handle identifiers, such as Internet protocol (IP) addresses, and may provide application programming interface (API) calls which may be used to manipulate power management policies of those of cloud servers 122 that are enabled to provide power management services. Service metadata may be information about the capabilities of a service. The record may provide information about the power management services of the cloud servers 122 and may therefore be a service metadata record, or a metadata record.

Cloud management server 120 may include a processor or processor core(s) 124, storage 126, peripheral interface 128, and/or network interface 130.

Processor 124 may be configured to retrieve information from cloud servers 122 and compile/create a record based on the retrieved information by executing one or more instructions stored on storage 126. Similar to processor 112, processor 124 may be any one of a number of single or multi-core processors.

Storage 126 may be volatile memory, non-volatile memory, and/or a combination of volatile memory and non-volatile memory. Storage 126 may store a plurality of instructions which, when executed, may cause processor 124 to gather information from cloud servers 122 and communicate the gathered information to cloud customer server 108 through network(s) 106. The instructions will be discussed further in connection with FIG. 2, according to various embodiments.

Peripheral interface 128 may enable a variety of user interfaces, such as mice, keyboards, monitors, and/or audio commands. For example, peripheral interface 128 may enable USB ports, PS/2 ports, Firewire® ports, Bluetooth®, and a like, according to various embodiments.

Network interface 130 may be coupled to cloud servers 122 and to network(s) 106 through a network connection 131. Network interface 130 may be a wireless local area network interface, such as a WiFi® interface in compliance with one of the IEEE 802.11 standards. In alternate embodiments, network interface 130 may include, but is not limited to, a wireless personal network interface, such as a Bluetooth® interface. Network interface 130 may include a wireless wide area network interface, such as 3G or 4G telecommunication interface.

Cloud servers 122 may be configured to provide a variety of cloud-based services. According to embodiments, from the perspective of cloud customer server 108, cloud servers 122 may be one or more remote servers configured to support or provide one or more remote computing services, e.g., cloud-based services. Cloud servers 122 may provide cloud-based services to users outside of cloud data center 104 based on instructions, commands, and or security policies received from cloud management server 120, according to embodiments of the disclosure. According to embodiments, cloud servers 122 may represent servers associated with a broad range of search engine, social networking and/or e-commerce websites. Example of such websites may include, but are not limited to, Google®, Facebook®, and Amazon®. While cloud customer data center 102 may be the headquarters or the owner of the cloud-based websites, actual operation of servers that host the websites may have been outsourced to an owner and/or operator of cloud data center 104. According to various embodiments, cloud servers 122 may be configured to receive power management commands from cloud customer server 108 to reduce overall power consumption of cloud servers 122 in order to reduce operating costs.

Cloud servers 122 may include a network interface 132. Network interface 132 may be similar to network interface 130 and network interface 118. Network interface 132 may enable cloud servers 122 to receive instructions and/or commands from cloud management server 120 and may enable cloud servers 122 to provide power management-based information or capabilities to cloud management server 120. Network interface 132 may also enable cloud servers 122 to respond to queries and or commands received from cloud customer server 108. Cloud servers 122 may also include storage 138, processor 136, power supply 134, and a power management controller 140.

Power management controller 140 may be configured to monitor power consumption of one or more of storage 138, processor 136, and/or power supply 134. Power management controller 140 may determine power consumption based on voltage sensors, current sensors, temperature sensors, and/or other sensors of the like, located proximate to each of storage 138, processor 136, and/or power supply 134. Power management controller 140 may be configured to be responsive to instructions received from network interface 132. For example, power management controller 140 may provide network interface 132 with data that may be indicative of power management services available through power management controller 140. According to other embodiments, power management controller 140 may be enabled to cause one or more of cloud servers 122 to enter a low-power mode, to hibernate, and/or to power down. According to embodiments, even while cloud server 122 is powered down, external computing devices such as cloud management server 120 and/or cloud customer server 108 may be enabled to access power management controller 140 through network interface 132.

Storage 138 may include, but is not limited to, non-volatile memory and/or volatile memory. Storage 138 may include a variety of instructions which, when executed by processor 136, may cause and/or enable processor 136 to provide cloud services to one or more users of network(s) 106.

Power supply 134 may provide power to each of the variety of components included in each of cloud servers 122.

Network(s) 106 are intended to represent a broad range of wired or wireless, local or wide area networks, private or public, including e.g., the Internet.

Figure 2:
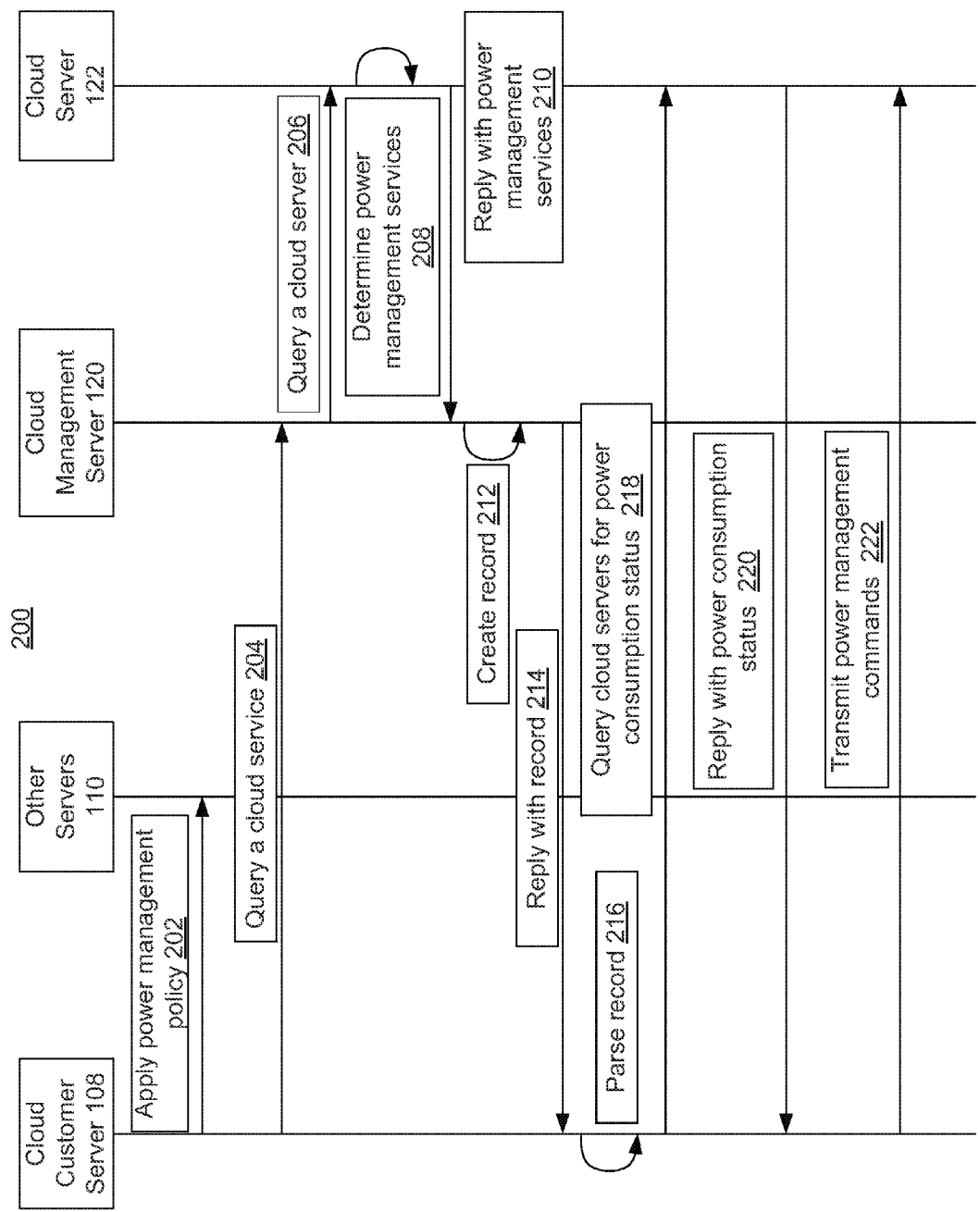
FIG. 2 illustrates a method of the arrangement of FIG. 1.

FIG. 2 illustrates a method of the arrangement of FIG. 1, in accordance with various embodiments. As shown, method 200 may begin at block 202. At block 202 cloud customer server 108 may apply a power management policy to a number of other servers 110 that may be operated in the same data center as customer server 108. By applying a power management policy to servers 110, cloud customer server 108 may provide cost savings to the data center by increasing loads on some of servers 110 in order to power down others of servers 110 for a net power savings. At block 204, cloud customer server 108 may perform discovery on a cloud service provider by querying cloud management server 120 for a record of power management services. At block 206, cloud management server 120 may query cloud servers 122 to determine which, if any, of cloud servers 122 may be enabled to provide power management services. For example, cloud management server 120 may query each of cloud servers 122 to determine which, if any, include a power management controller. At block 208, each of cloud servers 122 may execute a diagnostic check or run a self-query to determine which power management services are available. At block 210, each of cloud servers 122 may reply to the query from cloud management server 120 with data or a list indicating which power management services the cloud server 122 may provide.

At block 212, cloud management server 120 may create a record that includes power management services that are available from each of cloud servers 122. Cloud management server 120 may include additional information in the record. For example, cloud management server 120 may include IP addresses associated with each of cloud servers 122. More particularly, the IP addresses may provide access to power management controllers that may be included in the cloud servers 122. Cloud management server 120 may create the record to include other information, such as passwords, other handles to access cloud servers 122, and/or API calls to enable cloud customer server 108 to manipulate power management services of cloud servers 122.

At block 214, cloud management server 120 may provide the record to cloud customer server 108, in response to the query of block 204. Cloud management server 120 may encrypt the record prior to transmission to cloud customer server 108, for example, by using public key infrastructure (PKI) certificates. Alternatively or additionally, cloud management server 120 may create a message authentication code (MAC), based on a hash function, to be transmitted with the record to enable cloud customer server 108 to authenticate that the record has not been altered during transmission through network 106.

At block 216, cloud customer server 108 may parse the record to discover which, if any, power management services are available on cloud servers 122, which may be hosting the cloud service that the customer may be subscribed to. From the record, cloud customer server 108 may also determine or retrieve handle identifiers, e.g., IP addresses, of the power management enabled cloud servers 122. Before parsing, cloud customer server 108 may authenticate at least part of the information included in the record. At block 218, cloud customer server 108 may query cloud servers 122 to determine power consumption status of components, such as processors, memory, and power supplies. Cloud customer server 108 may initiate the query based on handle identifiers, IP addresses, and/or other information included in the record. At block 220, power management controllers and/or processors of cloud servers 122 may reply to the query with power consumption data or status. Power consumption data may include indication of the load of each of the processors of cloud servers 122 to enable cloud customer server 108 to determine if one or more cloud servers 122 may be powered down without loss of quality of service. At block 222, cloud customer server 108 may transmit power management commands to cloud servers 122 based on the power consumption status(es) received. For example, cloud customer server 108 may transmit power management commands to cause cloud servers 122 to hibernate, enter standby, enter another low-power mode, power down, or issue power limitation commands. In addition to power management commands, cloud customer server 108 may also reconfigure one or more cloud servers 122 to include cloud servers 122 within the same subnetwork (subnet) as servers 110. By including cloud servers 122 within the same subnet as servers 110, cloud customer server 108 may include the outsourced servers as part of a single trusted pool and may extend the enterprise perimeter to increase the size of the trusted compute base of cloud customer server 108.

Alternatively, at block 218, cloud customer server 108 may be configured to query cloud management server 120, and cloud management server 120 may directly query cloud servers 122. Additionally, at block 222 cloud customer server 108 may transmit power management commands to cloud servers 122 through cloud management server 120. According to various embodiments, cloud servers 122 may be configured to reply directly to cloud customer server 108 via network(s) 106, or cloud servers 122 may be configured to reply to cloud customer server 108 through cloud management server 120.

Upon receipt of the record from cloud management server 120, cloud customer server 108 may be enabled to further manipulate cloud servers 122. For example, by using information from the record, cloud customer server 108 may transplant or install code onto cloud servers 122. According to various embodiments, the code may enable cloud customer server 108, cloud management server 120, and/or other computing devices to determine which power management services are available from cloud servers 122. Similar to transmission of the record, transplanted or installed code may be encrypted or be subject to an attestation scheme to ensure that the code has not been tampered with in transit.

According to various embodiments, cloud customer server 108 may receive power management policies from an administrative management computing device that is remote to both cloud customer data center 102 and cloud data center 104.

While cloud servers 122 may provide power management service information at lower levels of the open systems interconnect (OSI) stack, e.g., network or physical layers, to enable searchability of the service, various programs of cloud servers 122 may suppress or hide the availability of power management services for security purposes, according to various embodiments.

Figure 3:
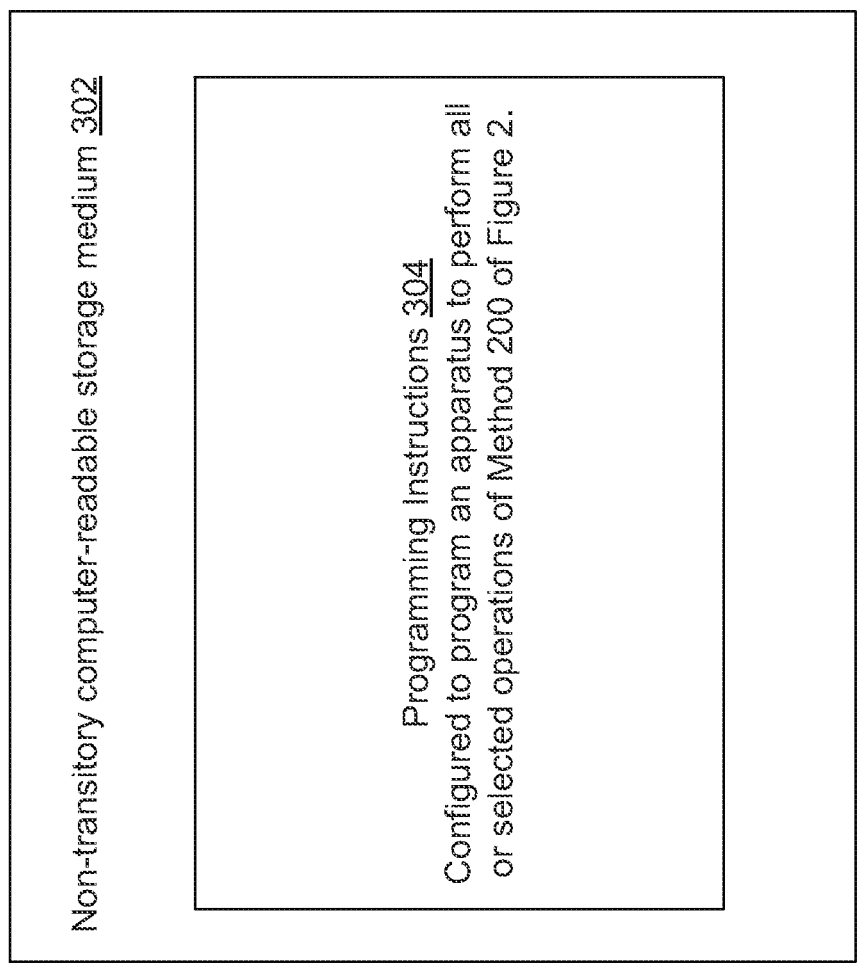
FIG. 3 illustrates an example computer-readable storage medium having instructions configured to practice all or selected aspects of the method of FIG. 2; all arranged in accordance with embodiments of the present disclosure.

FIG. 3 illustrates an example computer-readable storage medium having instructions configured to practice all or selected aspects of the method of FIG. 2, in accordance with various embodiments of the present disclosure. As illustrated, computer-readable storage medium 302 may include a number of programming instructions 304. Programming instructions 304 may be configured to enable a computing device to perform the customer server operations or the cloud management server operations or the cloud server operations of method 200 earlier described with references to FIG. 2. In alternate embodiments, programming instructions 304 may be disposed on multiple computer-readable storage media 302 instead. In various embodiments, computer-readable storage medium 302 may be a non-transitory storage medium.

Various embodiments may include at least one computer readable medium having a number of instructions stored therein and configured to enable a local server, in response to execution by one or more processors of the local server, to query a remote computing service having one or more remote servers and receive a record from the remote computing service in response to the query. The record may include information related to power management services available from the one or more remote servers. The instructions may enable the one or more processors to transmit power management commands, based on the information, to the remote computing service to at least partially control power consumption by the one or more remote servers. The information related to the record may include handle identifiers of the power management services or application programming interface (API) calls for the power management services.

According to embodiments, the instructions may be further configured to enable the local server, in response to execution by the one or more processors of the local server, to transmit the power management commands, using the API calls for the power management services and the handle identifiers, to reduce central processing unit (CPU) power consumption of the one or more remote servers.

According to embodiments, the instructions may be further configured to enable the local server, in response to execution by the one or more processors of the local server, to transmit the power management commands, using the API calls for the power management services, to the remote computing service to receive power consumption data of the one or more remote servers. The power consumption data may indicate a quantity of power consumed by each of the one or more remote servers.

According to embodiments, the instructions may be further configured to enable the local server, in response to execution by the one or more processors of the local server, to transmit the power management commands to the remote computing service to cause selected ones of the one or more remote servers to enter into at least one of a low-power mode or a power-down mode, based on the power consumption data of the one or more remote servers. The power consumption data may include power supply data, memory data, and processor data.

According to embodiments, the instructions may be further configured to enable the local server, in response to execution by the one or more processors of the local server, to determine from the record which ones of the one or more remote servers are enabled to be remotely power managed; and configure the remote power manage enabled ones of the one or more remote servers to a subnet shared by the local server to enable power management of the remote power manage enabled ones of the one or more remote servers by the local server.

The instructions may be further configured to enable the local server, in response to execution by the one or more processors of the local server, to authenticate at least part of the information included in the record.

According to various embodiments, a method may include querying a remote computing service, by a customer server, having one or more remote servers. The method may include receiving a record, by the customer server, from the remote computing service in response to the query. The record may include information related to power management services available from the one or more remote servers. The method may include transmitting power management commands, based on the information, to the remote computing service to at least partially control power consumption by the one or more remote servers.

According to various embodiments, a method may include receiving a request, by a remote computing management server from a customer server, for a record of power management services available by a number of remote computing servers that are networked to provide remote computing services and that are managed by the remote computing management server. The method may include determining, by the remote computing management server, ones of the number of remote computing servers that provide the power management services and creating, by the remote computing management server, the record of the power management services based on said determining. The method may include transmitting the record of the power management services to the customer server, in response the request for the record, to enable the customer server to access the power management services provided by the ones of the number of remote computing servers. The record may include internet protocol (IP) addresses of power management controllers of each of the ones of the one or more remote computing servers that provide the power management services. The record may include power management service application programming interface (API) calls to enable manipulation of the power management controllers.

According to embodiments, the method may also include receiving, by the remote computing management server, instructions from the customer server to transmit data related to power consumed by each of the ones of the one or more remote computing servers that provide the power management services; and transmitting, to the customer server, the data related to the power consumed by each of the one or more remote computing servers.

According to embodiments, the method may further include, in response to instructions from the customer server, transferring tasks from first partially loaded ones of the one or more remote computing servers that provide the power management services to second partially loaded ones of the one or more remote computing servers that provide power management service; and causing the first partially loaded ones of the one or more remote computing servers to power-down or to enter a low-power mode.

According to embodiments, the method may further include receiving, by the one or more remote computing servers, one or more programs from the customer server; installing the one or more programs onto the one or more remote computing servers; and enabling control of the one or more remote computing servers by the customer server through the one or more programs.

According to embodiments, the method may further include generating a message authentication code from the record; and transmitting the message authentication code with the record to the remote server, in response to the request, to enable the remote server to verify the authenticity of the record.

According to various embodiments, one or more computer readable media may include a number of instructions which, if executed by a processor of a customer server, may enable a customer server to operate according to the above described method.

According to various embodiments, a server may include a network interface configured to communicate with a remote computing service through a remote computing management server; memory coupled to the network interface and configured to store a number of instructions; and a processor coupled to the memory and the network interface. The processor may be configured to execute the number of instructions to send a request, via the network interface to the remote computing management server, to receive a record of remote computing servers that are managed by the remote computing management server to provide remote computing service for the server and that include power management controllers. The record may include handles that identify respective ones of the power management controllers. The processor may be further configured to execute the number of instructions to monitor power consumption of the remote computing servers and to selectively cause some of the remote computing servers, by using the handles, to enter a low-power mode based on the monitored power consumption. The processor may be configured to execute the number of instructions to authenticate that the record is unchanged upon receipt by the server.

According to various embodiments, a remote computing server may include a power supply; memory coupled to the power supply to receive power and to store a number of instructions; and one or more processors coupled to the power supply to receive power and coupled to the memory to execute the number of instructions stored by the memory. The remote computing server may include a number of power consumption meters configured to measure power consumption of the power supply the memory, and the one or more processors. The remote computing server may include a power management controller configured to collect data corresponding to the measured power consumption and configured to reduce the power consumption of the one or more processors in response to instructions received by a customer server subscribed to receive remote computing services from the remote computing server. The instructions may be based on power management application programming interface (API) calls made with a handle for the remote computing server. The handle may be managed by a remote computing management server. The remote computing server may include a network interface configured to transfer data between the processor, the power management controller, and a network. The power management controller may be configured to be responsive to the instructions while the remote computing server is powered down or in a low-power mode. The power management controller may be configured to provide a list of power management services available by the remote computing server in response to a power management service query from the remote computing management server to enable the remote computing management server to create a record that includes the list of power management services.

According to various embodiments, a remote computing management server may include a network interface configured to communicatively couple the remote computing management server to one or more remote computing servers; and memory configured to store a number of instructions for transferring information to and from the one or more remote computing servers. The remote computing management server may include one or more processors configured to execute the number of instructions to support or provide remote computing services. The one or more processors may be configured to execute the number of instructions to create a record that includes power management services provided by the one or more remote computing servers, in response to a query from a customer server that receives the remote computing services. The one or more processors may be configured to create the record to include one or more network identifiers of the one or more remote computing servers that provide power management services. The one or more processors may be configured to execute the number of instructions to generate a security code based on the record and to transmit the security code with the record to the customer server to enable the customer server to authenticate the record.

According to various embodiments, at least one computer readable medium may have a number of instructions stored therein and configured to enable a remote computing server, in response to execution by one or more processors of the remote computing server, to provide remote computing services to one or more customer servers and to determine whether the remote computing server is configured to provide remote power management services. The number of instructions may enable the remote computer server to reply to a query from a managing server that is configured manage the remote computer server and other remote computing server. Replying to the query may include indicating which, if any, power management services the remote computing server is configured to provide. The number of instructions may enable the remote computer server to, in response to power management commands received from at least one of the one or more customer servers, decrease power consumption by the remote computing server.

In embodiments, the instructions may be further configured to enable the one or more processors of the remote computing server to monitor a power consumption of a power supply of the remote computer server, monitor a power consumption of the one or more processors, and transmit the power consumption of the power supply and the power consumption of the one or more processors to the at least one of the one or more customer servers. In embodiments, decreasing power consumption may include causing the remote computing server to enter a shut down sequence.

According to various embodiments, a method may include providing remote computing services to one or more customer servers; and determining whether the remote computing server is configured to provide remote power management services. The method may include replying to a query from a managing server that is configured manage the remote computer server and other remote computing server, wherein replying to the query includes indicating which, if any, power management services the remote computing server is configured to provide; and, in response to power management commands received from at least one of the one or more customer servers, decrease power consumption by the remote computing server.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. At least one non-transitory computer readable medium having a plurality of instructions stored therein, the plurality of instructions to enable a local server of a customer, in response to execution of the plurality of instructions by one or more processors of the local server, to:
   implement a first power management policy on a first group of servers;
   query a remote computing service, having a second group of remote servers on which a second power management policy is to be implemented, wherein the second group is different than the first group, for information related to power management services available from the remote servers of the second group, wherein the remote computing service is a cloud computing service to which a customer associated with the computing device has subscribed, and wherein the remote servers of the second group are, at least in part, assigned to carry out cloud computing services for the customer;
   receive encrypted data of a record from the remote computing service in response to the query, the record including the information related to power management services available from the remote servers of the second group, wherein the information includes an indication of one or more of the remote servers of the second group that each include a power management controller and are configured to receive power management commands from the computing device, wherein the one or more power management controllers are to collect power consumption data for at least a power supply, a memory, or a processor of the second group of servers; and
   transmit power management commands, based on the information, to the remote computing service to manipulate an implementation of the second power management policy so as to at least partially control power consumption of the second group of remote servers.

2. The at least one computer readable medium of claim 1, wherein the information related to the record includes handle identifiers of the one or more remote servers of the second group and application programming interface (API) calls for the power management services available from the one or more remote servers.

3. The at least one computer readable medium of claim 2, wherein the plurality of instructions are further to enable the local server, in response to execution of the plurality of instructions by the one or more processors of the local server, to transmit the power management commands, using the API calls for the power management services and the handle identifiers of the one or more remote servers of the second group, to reduce central processing unit (CPU) power consumption of the at least one of the one or more remote servers of the second group.

4. The at least one computer readable medium of claim 2, wherein the instructions are further to enable the local server, in response to execution by the one or more processors of the local server, to transmit the power management commands, using the API calls for the power management services, to the remote computing service to receive power consumption data of the one or more remote servers of the second group, wherein the power consumption data indicates a quantity of power consumed by each of the one or more remote servers of the second group.

5. The at least one computer readable medium of claim 4, wherein the instructions are further to enable the local server, in response to execution by the one or more processors of the local server, to transmit the power management commands to the remote computing service to cause selected ones of the one or more remote servers of the second group to power-down, based on the power consumption data of the one or more remote servers of the second group.

6. The at least one computer readable medium of claim 5, wherein the power consumption data includes power supply data, memory data, and processor data.

7. The at least one computer readable medium of claim 1, wherein the instructions are further to enable the local server, in response to execution by the one or more processors of the local server, to:
   configure the one or more remote servers of the second group to a same subnet as the local server to enable power management of the one or more remote servers of the second group by the local server.

8. The at least one computer readable medium of claim 1, wherein the instructions are further to enable the local server, in response to execution by the one or more processors of the local server, to:
   authenticate at least part of the information included in the encrypted data of the record.

9. The at least one computer readable medium of claim 1, wherein the plurality of instructions are further to utilize an authentication code provided with the encrypted data of the record to authenticate that the record has not been altered during transmission.

10. A method, comprising:
receiving, by a cloud computing management server of a cloud computing service, a request, from a customer server of a customer of the cloud computing service, for a record of power management services available from a plurality of cloud computing servers that are networked and managed by the cloud computing management server;
determining, by the cloud computing management server, one or more cloud computing servers of the plurality of cloud computing servers that are to provide the power management services;
creating, by the cloud computing management server, the record of the power management services based on said determining, wherein the record includes an indication of the one or more cloud computing servers that are to receive power management commands from the customer server;
transmitting, by the cloud computing management server, encrypted data of the record of the power management services to the customer server, in response to the request for the record, to enable the customer server to access the power management services provided by the one or more cloud computing servers; and
in response to instructions from the customer server, transferring tasks from a first partially loaded cloud computing server of the one or more cloud computing servers to a second partially loaded cloud computing server of the one or more cloud computing servers, wherein the instructions are provided based at least in part on a result of the customer server accessing the power management services provided by the one or more cloud computing servers.

11. The method of claim 10, wherein the record includes internet protocol (IP) addresses of the one or more cloud computing servers, wherein the record includes power management service application programming interface (API) calls to enable manipulation, by the customer server, of a power management controller of each of the one or more of the cloud computing servers.

12. The method of claim 10, further comprising:
receiving, by the cloud computing management server, commands from the customer server to transmit data related to power consumed by each of the one or more cloud computing servers; and
transmitting, to the customer server, the data related to the power consumed by each of the one or more cloud computing servers.

13. The method of claim 10, further comprising:
in response to instructions from the customer server, causing the first partially loaded cloud computing server to power-down or enter a low-power mode.

14. The method of claim 10, further comprising:
receiving, by the one or more cloud computing servers, one or more programs from the customer server;
installing the one or more programs onto the one or more cloud computing servers; and
enabling control of the one or more cloud computing servers by the customer server via the one or more programs.

15. A method, comprising:
receiving, by a cloud computing management server of a cloud computing service, a request, from a customer server of a customer of the cloud computing service, for a record of power management services available from a plurality of cloud computing servers that are networked and managed by the cloud computing management server;
determining, by the cloud computing management server, one or more cloud computing servers of the plurality of cloud computing servers that are to provide the power management services;
creating, by the cloud computing management server, the record of the power management services based on said determining, wherein the record includes an indication of the one or more cloud computing servers that are to receive power management commands from the customer server;
transmitting, by the cloud computing management server, the record of the power management services to the customer server, in response to the request for the record, to enable the customer server to access the power management services provided by the one or more cloud computing servers;
in response to instructions from the customer server, transferring tasks from a first partially loaded cloud computing server of the one or more cloud computing servers to a second partially loaded cloud computing server of the one or more cloud computing servers;
generating a message authentication code from the record; and
transmitting the message authentication code with the record to the customer server, in response to the request, to enable the customer server to verify authenticity of the record.

16. A customer server of a customer of a cloud computing service, comprising:
a network interface to communicate with the cloud computing service via a cloud computing management server;
memory coupled to the network interface, the memory to store a plurality of instructions; and
a processor coupled to the memory and the network interface, the processor to execute the plurality of instructions to:
implement a first power management policy on a first group of servers;
send, via the network interface, a request, to the cloud computing management server, for information related to power management services available from a second group of cloud computing servers on which a second power management policy is to be implemented, wherein the second group is different than the first group, and wherein the plurality of cloud computing servers of the second group are of the cloud computing service and, at least in part, assigned to the customer;
receive, in response to the request, encrypted data of a record of the cloud computing servers of the second group, wherein the record includes an indication of one or more cloud computing servers of the second group, and wherein the cloud computing servers of the second group are configured to provide power management services and receive power management commands from the customer server; and
configure the one or more cloud computing servers of the second group to a same subnet as the servers of the first group to enable manipulation of an implementation of the second power management policy.

17. The customer server of claim 16, wherein the record includes handles that identify respective ones of the one or more cloud computing servers of the second group, the processor further to execute the plurality of instructions to transmit a command to at least one of the one or more cloud computing servers of the second group to monitor power consumption of the at least one of the one or more cloud computing server of the second group and to selectively cause, via the handles, some of the one or more cloud computing servers of the second group to enter a low-power mode based on the monitored power consumption.

18. The customer server of claim 16, wherein the processor is further to execute the plurality of instructions to authenticate that the record is unchanged upon receipt by the customer server.

19. A cloud computing server, comprising:
a power supply;
memory coupled to the power supply to receive power and to store a plurality of instructions;
one or more processors coupled to the power supply to receive power and coupled to the memory to execute the plurality of instructions stored by the memory;
a plurality of power consumption meters to measure power consumption of the power supply, the memory, and the one or more processors;
a power management controller to:
collect data corresponding to the measured power consumption;
reduce the power consumption of the one or more processors in response to commands received from a customer server subscribed to cloud computing services provided, at least in part, by the cloud computing server, wherein the instructions are provided based at least in part on a result of the customer server accessing the power management services provided by the one or more cloud computing servers; and wherein the instructions are based on power management application programming interface (API) calls made utilizing a handle associated with the cloud computing server, wherein the handle is managed by a cloud computing management server; and
provide a list of power management services that the cloud computing server is capable of providing in response to a power management service query from the cloud computing management server to enable the cloud computing management server to create a record that includes the list of power management services; and
a network interface to transfer data between the processor, the power management controller, and a network, the network interface to transmit encrypted data of the record over the network.

20. The cloud computing server of claim 19, wherein the power management controller is to be responsive to the instructions while the cloud computing server is powered down.

21. The cloud computing server of claim 19, wherein the power management controller is to:

generate a message authentication code from the record; and
cause the message authentication code to be transmitted with the encrypted data of the record to the customer server, in response to the query, to enable the customer server to verify authenticity of the record.

22. A cloud computing management server of a cloud data center, comprising:
a network interface to communicatively couple the cloud computing management server to a plurality of cloud computing servers of the cloud data center;
memory to store a plurality of instructions for transferring information to and from the plurality of cloud computing servers; and
one or more processors to execute the plurality of instructions to provide cloud computing services, wherein to provide cloud computing services includes creation of a record that includes power management services that the plurality of cloud computing servers are capable of providing, in response to a query from a customer server, of a customer of the cloud data center, that receives the cloud computing services provided by the plurality of cloud computing servers, wherein the record includes an indication of one or more cloud computing servers that each include a power management controller and are to receive power management commands from the customer server, wherein the power management commands are provided based at least in part on a result of the customer server accessing the power management services provided by the one or more cloud computing servers, wherein the power management controller is to collect power consumption data for at least a power supply, a memory, or a processor; and
the network interface to transmit encrypted data of the record over a network in response to receipt of the query from the customer server.

23. The cloud computing management server of claim 22, wherein the one or more processors are to create the record to include one or more network identifiers associated with the one or more cloud computing servers.

24. The cloud computing management server of claim 22, wherein the one or more processors are to execute the plurality of instructions to generate a security code based on the record and to transmit the security code with the encrypted data of the record to the customer server to enable the customer server to authenticate the record.

25. The cloud computing management server of claim 22, wherein the one or more processors are to:
generate a message authentication code from the record; and
cause the message authentication code to be transmitted with the encrypted data of the record to the customer server, in response to the query, to enable the customer server to verify authenticity of the record.

* * * * *